United States Patent
DuFaux et al.

(10) Patent No.: US 10,690,471 B1
(45) Date of Patent: Jun. 23, 2020

(54) RIGID EXTENDABLE MEASURING TOOL

(71) Applicants: Stephen C. DuFaux, Naples, FL (US); Kristin E. DuFaux, Naples, FL (US)

(72) Inventors: Stephen C. DuFaux, Naples, FL (US); Kristin E. DuFaux, Naples, FL (US)

( * ) Notice: Subject to any disclaimer, the term of this patent is extended or adjusted under 35 U.S.C. 154(b) by 221 days.

(21) Appl. No.: 16/050,303

(22) Filed: Jul. 31, 2018

(51) Int. Cl.
*G01B 3/08* (2006.01)

(52) U.S. Cl.
CPC ........................ *G01B 3/08* (2013.01)

(58) Field of Classification Search
CPC .................................................. G01B 3/08
USPC .......................................................... 33/809
See application file for complete search history.

(56) References Cited

U.S. PATENT DOCUMENTS

| | | | |
|---|---|---|---|
| 648,576 A | 5/1900 | Taylor | |
| 1,088,175 A * | 2/1914 | Phillips | G06G 1/04 235/70 R |
| 1,119,450 A | 12/1914 | Parr | |
| 1,488,482 A | 4/1924 | Eckman | |
| 2,583,205 A | 1/1952 | Boisen | |
| 3,222,789 A | 12/1965 | Bishop et al. | |
| 3,492,737 A | 2/1970 | Swanson | |
| 4,899,452 A * | 2/1990 | Schafer | G01C 15/06 33/296 |
| 4,989,332 A * | 2/1991 | Worrallo | B43L 7/005 33/342 |
| 5,873,175 A * | 2/1999 | Johnston | G01B 3/08 33/783 |
| 6,820,342 B2 | 11/2004 | Ramsthaler | |
| 8,122,611 B1 * | 2/2012 | Kallsen | B43L 7/12 33/462 |
| 2013/0152416 A1 * | 6/2013 | Yi | G01B 5/061 33/464 |
| 2018/0023934 A1 * | 1/2018 | Gjertsen | G01B 3/563 33/809 |
| 2018/0156612 A1 * | 6/2018 | Miller | G01C 9/02 |

\* cited by examiner

*Primary Examiner* — George B Bennett
(74) *Attorney, Agent, or Firm* — Bryan L. Loeffler, Esq.; Loeffler IP Group, P.A.

(57) ABSTRACT

A rigid extendable measuring tool (1) having a preferably rectangular-shaped tubular housing (2) having an inner extendable rule member (3) that slides into and out of the housing for accurately measuring between objects such as walls, floors and ceilings, which can be used easily by a single user without the need for a second set of hands.

20 Claims, 3 Drawing Sheets

View A-A

RIGID EXTENDABLE MEASURING TOOL

FIELD OF THE INVENTION

This invention relates to measuring devices used for carpentry and more particularly to a rigid extendable measuring tool for accurately measuring between objects such as walls, floors and ceilings, which can be easily used by an individual user without the need for a second set of hands and provides multiple measuring and marking functions.

BACKGROUND OF THE INVENTION

Measuring tools are a common requirement for carpenters and tradesmen while working on a job site. The most common measuring tool is the tape measure. Conventional tape measures have an elongated metal strip that retracts into a housing on a spool. Because the metal tape is flexible it can be awkward when trying to obtain an accurate measurement between long distances. For example, in many horizontal and vertical measurements beyond arm's length, a first individual is needed to support a distal end of the tape while a second individual supports a proximal end of the tape and reads a measurement. A single individual cannot manage supporting both ends and/or middle of the tape to prevent the tape from sagging or bending.

In addition, it is difficult to obtain exact measurements when measuring vertically or to an inside corner because the measuring tape must be partially folded into the inside corner. Then, the measurement must be estimated by eyeing the position of the graduated markings on the steel tape in relation to the inside corner. This measurement is oftentimes an estimate or best guess.

Therefore, a need exists for a rigid extendable measuring tool for accurately measuring between objects such as walls, floors and ceilings, and can be easily used by an individual user without the need for a second set of hands and provides multiple measuring and marking functions.

The relevant prior art includes the following references:

| Pat. No. | Inventor | Issue/Publication Date |
|---|---|---|
| \multicolumn{3}{c}{(U.S. Pat. References)} | | |
| 648,576 | Taylor | May 1, 1900 |
| 1,119,450 | Parr | Dec. 1, 1914 |
| 1,488,482 | Eckman | Apr. 1, 1924 |
| 2,583,205 | Boisen | Jan. 22, 1952 |
| 3,222,789 | Bishop et al. | Dec. 14, 1965 |
| 3,492,737 | Swanson | Feb. 3, 1970 |
| 6,820,342 | Ramsthaler | Nov. 23, 2004 |

SUMMARY OF THE INVENTION

The primary object of the present invention is to provide a rigid extendable measuring tool for accurately measuring between objects such as walls, floors and ceilings, which can be easily used by an individual user without the need for a second set of hands.

An additional object of the present invention is to provide a rigid extendable measuring tool that provides multiple measuring and marking functions.

The present invention fulfills the above and other objects by providing a rigid extendable measuring tool having a preferably rectangular-shaped tubular housing having an inner extendable rule member that slides into and out of the housing.

The inner extendable rule member preferably has at least one guide channel located thereon that engages at least one guide projection located on an internal surface of the housing. For example, the inner extendable rule member may be substantially I-shaped and the external housing may have an internal surface that is substantially H-shaped. A slide stop is preferably located on a proximal end of the inner extendable rule member that engages a block stop located on an internal surface of the housing to prevent the internal extendable rule member from being overextended and separating from the housing or tilting downward or sagging.

The rigid extendable measuring tool may be available in multiple lengths. At least one window is located on the housing that allows a user to view the inner extendable rule member within the housing. The window allows a user to stand centered on a wall being measured and hold the rigid extendable measuring tool without the assistance of a second person. Graduated markings are printed on an outer surface of the inner extendable rule member which line up with sight lines on the at least one window to allow a user to view the graduated markings as the inner extendable rule member is extended from the housing or retracted into the housing, thereby allowing the user to obtain a measurement between a distal end of the inner extendable rule member and a proximal end of the housing. Graduated markings are also located on an outer surface of the housing. For distances that are greater than the length of the housing, the graduated markings printed on the outer surface of the inner extendable rule member begin at the length of the housing. For example, if the length of the housing is three feet then the beginning measurement read through the window on the inner extendable rule member will be three feet and then will go up as the inner extendable rule member is extended out of the housing ending a measurement equal to three feet plus the length of the inner extendable rule member. The Said graduated markings may be any unit of measurement, such as metric, imperial and so forth, and may include additional markings to indicate common placement of items during construction, such as the placement of studs within a wall.

At least one leveling indicator, such as a bubble level is located on the housing to ensure the rigid extendable measuring tool is in a level or plumb position when measuring between two points.

The housing may have an external channel that may be substantially T-shaped or L-shaped to engage a marking tool, such as a speed square or T-square. This allows a user to place the rigid extendable measuring tool against a wall and then slide the marking tool within the external channel across a wall and to mark out perpendicular lines on the wall. One or more apertures may be located on the housing to allow a user to mount the housing to a wall using nails or screws to make the process easier. For example, if a user is measuring out a layout for installing upper cabinets, the user may first establish a horizontal line on which the bottom edges of the cabinets will rest. This is accomplished using the rigid extendable measuring tool and then by mounting the rigid extendable measuring tool to the wall. The at least one leveling indicator ensures the rigid extendable measuring tool is in a level position on the wall. The level horizontal line may then be marked on the wall with a pencil using the straight edge of the rigid extendable measuring tool. Then a user may slide the marking tool within the external channel using the graduated markings to determine location and placement of side edges of the cabinets and/or locations of studs within the wall. These locations may then be marked on the wall with a pencil using a straight edge of the marking tool to create vertical lines above or below the horizontal line. Alternatively, the extendable measuring tool may be placed in a vertical position to mark out horizontal lines.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
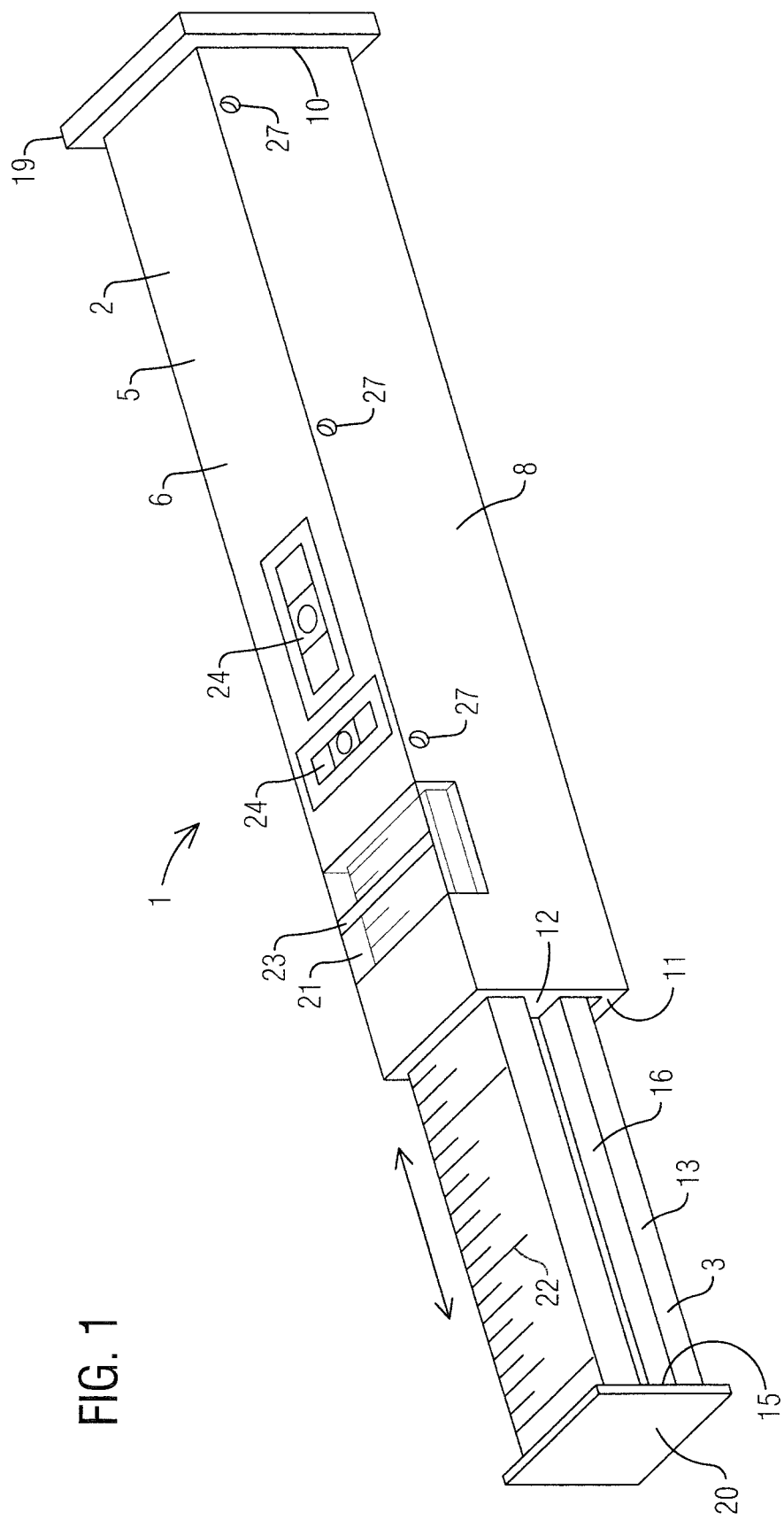
FIG. 1 is a perspective top view of a rigid extendable measuring tool of the present invention.
Figure 2:
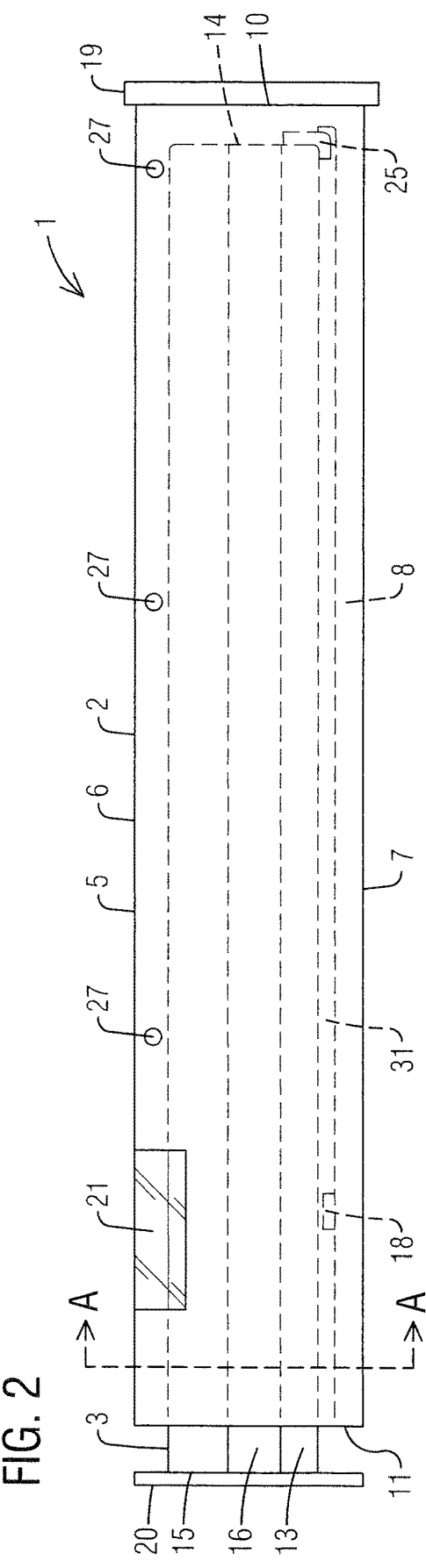
FIG. 2 is a plan side view of a rigid extendable measuring tool of the present invention.
Figure 3:
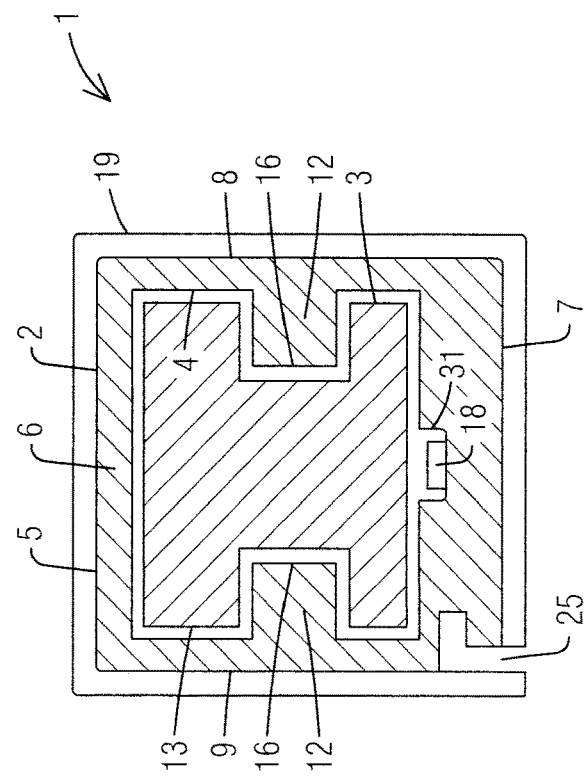
FIG. 3 is a cross sectional view along lines A-A of FIG. 2.

For purposes of describing the preferred embodiment, the terminology used in reference to the numbered accessories in the drawings is as follows:

1. rigid extendable measuring tool, generally
2. housing
3. inner extendable rule member
4. inner surface of the housing
5. outer surface of the housing
6. top panel of the housing
7. bottom panel of the housing
8. front panel of the housing
9. rear panel of the housing
10. proximal end of the housing
11. distal end of the housing
12. guide projection
13. outer surface of inner extendable rule member
14. proximal end of inner extendable rule member
15. distal end of inner extendable rule member
16. guide channel
17. slide stop
18. block stop
19. proximal base plate
20. distal base plate
21. window
22. graduated marking
23. sight line
24. leveling indicator
25. external channel
26. marking tool
27. aperture
28. smooth slot
29. notched slot
30. notch
31. slide channel With reference to FIG. 1-3, the rigid extendable measuring tool 1 comprises a preferably rectangular-shaped tubular housing 2 having an inner extendable rule member 3 that slides into and out of the housing 2. Said housing 2 having an inner surface 4, an outer surface 5, a top panel 6, a bottom panel 7, a front panel 8, a rear panel 9, a proximal end 10 and a distal end 11. At least one guide projection 12 is located on the inner surface 4 of the housing 2. As illustrated in FIG. 3, guide projections 12 located on the inner surface 4 of the housing 2 on the front panel 8 and the rear panel 9 create a substantially H-shaped inner surface 4 of the housing 2.

The inner extendable rule member 3 comprises an outer surface 13, a proximal end 14, distal end 15 and at least one guide channel 16 located on the outer surface 13 to engage the at least one guide projection 12 of the housing 2. As illustrated in FIG. 3, the inner extendable rule member 3 is substantially I-shaped to engage the substantially H-shaped internal surface 4 of the housing 2.

As illustrated in FIG. 2, a slide stop 17 is preferably located on the proximal end 14 of the inner extendable rule member 3. The slide stop 17 engages a slide channel 31 block stop 18 located on the internal surface 4 of the housing 2 to prevent the internal extendable rule member 3 from being overextended and separating from the housing 2.

A proximal base plate 19 is located on the proximal end 10 of the housing 2. The proximal base plate 19 preferably extends past the outer surface 5 of the housing 2 to allow the proximal base plate 19 to provide a stable surface to butt against a surface that is being measured and/or a surface adjacent or perpendicular to the surface being measured, such as an inside corner, floor, ceiling and so forth.

A distal base plate 20 is located on the distal end 15 of the inner extendable rule member 3. The distal base plate 20 preferably extends past the outer surface 13 of the inner extendable rule member 3 to allow the distal base plate 20 to provide a stable surface to butt against a surface that is being measured and/or a surface adjacent or perpendicular to the surface being measured, such as an inside corner, floor, ceiling and so forth. A user is capable of standing centered on a wall and hold the rigid extendable measuring tool 1 without the assistance of a second person. The distal base plate 20 may be recessed when the inner extendable rule member 3 is in a stored position to allow the inner extendable rule member 3 to not affect a measurement being taken using only the housing 2.

At least one window 21 is located on the housing 2 that allows a user to view the inner extendable rule member 3 within the housing 2. Graduated markings 22 are printed on the outer surface 13 of the inner extendable rule member 3 which are viewable through the at least one window 21 to allow a user to view the graduated markings 22 as the inner extendable rule member 3 is extended from the housing 2 or retracted into the housing 2, thereby allowing the user to obtain a measurement between the distal end 15 of the inner extendable rule 3 and the proximal end 10 of the housing 2. The window 21 allows a user to stand centered on a wall being measured and hold the rigid extendable measuring tool 1 without the assistance of a second person. The graduated markings 22 printed on the outer surface 13 of the inner extendable rule member 3 preferably begin at the maximum length of the housing 2. For example, if the housing is three feet long, then the graduated marking on the inner extendable rule member 3 will begin at thirty six inches. At least one sight line 23 may be located on the at least one window 21 to allow a user to verify the correct graduated marking 22 when obtaining a measurement. Said graduated markings 22 may be any unit of measurement, such as metric, imperial and so forth, and may include additional markings to indicate common measurement indicating location of items during construction, such as the placement of studs within a wall. In addition, graduated markings 22 may be located on the outer surface 5 of the housing 2 and may be on the top, bottom, front or rear portions of the outer surface 5 so measurements may be read from different directions.

At least one leveling indicator 24, such as a bubble level may be located on the housing 2 to ensure the rigid extendable measuring tool 1 is in a level or plumb position when measuring between two points or when mounted to allow hands free use.

Figure 4:
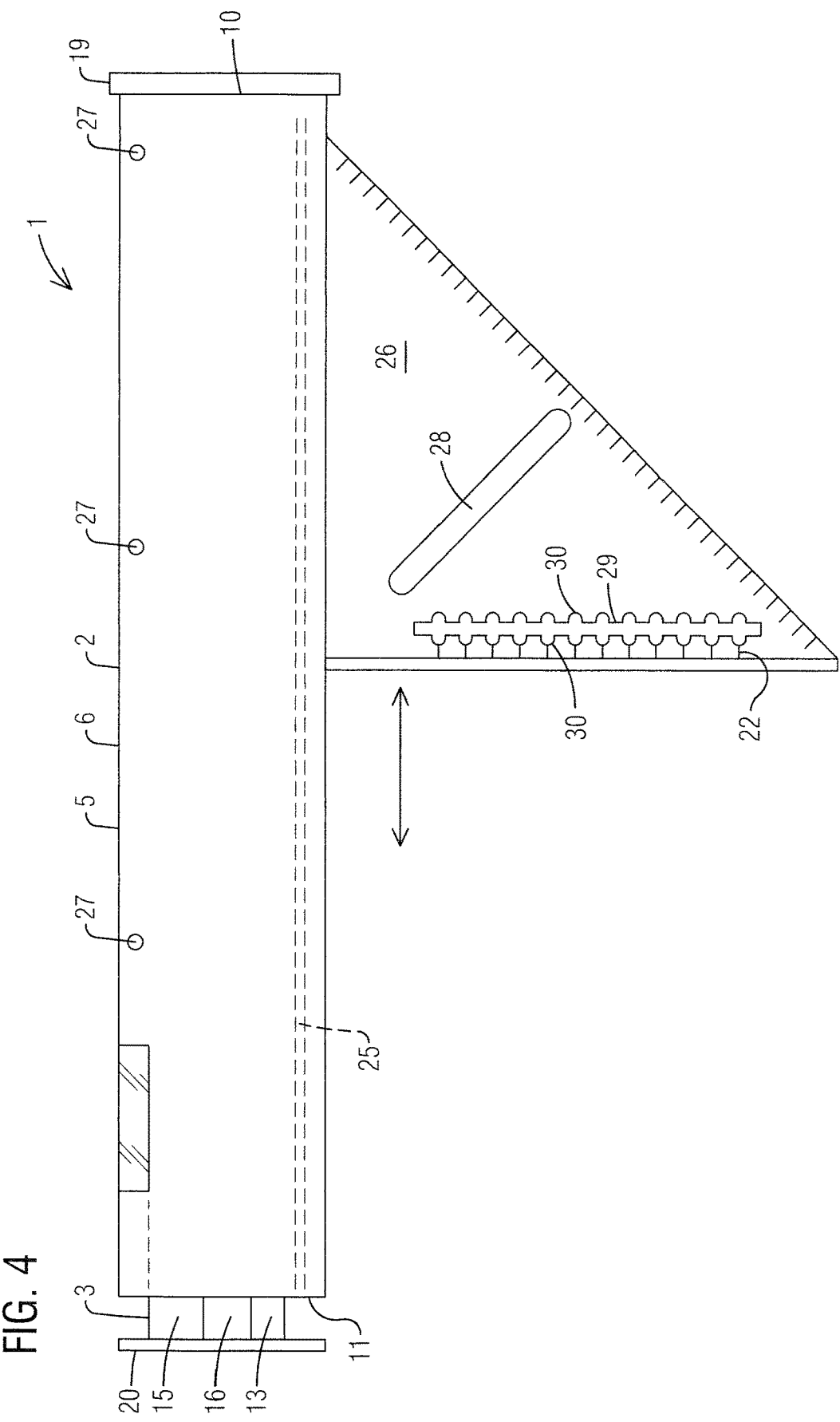
FIG. 4 is a side plan view of a rigid extendable measuring tool of the present invention having a marking tool attached via an external channel.

With reference to FIGS. 3 and 4, the housing 2 may have an external channel 25 that may be substantially T-shaped or L-shaped to engage a marking tool 26, such as a speed square, T-square, custom square, architect's curve, drawing tool and so forth. This allows a user to place and/or attach the rigid extendable measuring tool 1 against a wall and then slide the marking tool 26 along the external channel 25 to measure and mark out perpendicular lines. One or more apertures 27 may be located on the housing 2, as illustrated in FIGS. 1 and 2, to allow a user to mount the housing 2 to a wall using nails or screws to make the process easier. As illustrated herein, the marking tool 26 is a custom square that preferably triangular-shaped and has at least one T-shaped or L-shaped edge to engage the external channel 25 of the rigid extendable measuring tool 1. The marking tool 26 preferably comprises at least one smooth slot 28 to allow a user to mark a line. As illustrated herein, the smooth slot 28 is oriented at a forty five degree angle on the body of the measuring tool 26 to allow a user to mark an angled line in relation to the position of the rigid extendable measuring tool 26. The marking tool also preferably comprises a notched slot 29 that allows a user to lock a tip of a pencil within a notch 30 and then to drag the measuring tool 26 along the external channel 25 of the rigid extendable measuring tool 1, thereby creating a parallel line in relation to the rigid extendable measuring tool 1. Graduated markings 22 are located next to the notched slot 29 to allow a user to measure the distance between each notch 30 and the rigid extendable measuring tool 1.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described our invention, we claim:

1. A rigid extendable measuring tool comprising:
    a tubular housing an inner surface, an outer surface, a proximal end and a distal end;
    an inner extendable rule member having an outer surface, a proximal end and a distal end;
    said inner extendable rule member being insertable into said housing so that said inner extendable rule member is extendable from said housing;
    a plurality of graduated markings being located on said inner extendable rule member; and
    at least one guide located on the inner surface of said housing that engages at least one channel located on the outer surface of said inner extendable rule.

2. The rigid extendable measuring tool of claim 1 further comprising:
    at least one window located on the housing that allows a user to view the plurality of graduated markings located on the inner extendable rule within the housing.

3. The rigid extendable measuring tool of claim 1 further comprising:
    at least one leveling indicator located on the housing.

4. The rigid extendable measuring tool of claim 1 wherein:
    said at least one channel located on the outer surface of said inner extendable rule member being two channels making the inner extendable rule substantially I-shaped; and
    said at least one guide of the inner surface of the housing being two guides making the inner surface of the housing substantially H-shaped to engage the I-shaped inner extendable rule member.

5. The rigid extendable measuring tool of claim 1 further comprising:
    a slide stop located on the proximal end of the inner extendable rule member.

6. The rigid extendable measuring tool of claim 1 further comprising:
    a proximal base plate is located on the proximal end of the housing.

7. The rigid extendable measuring tool of claim 6 wherein:
    said proximal base plate extends past the external surface of the housing.

8. The rigid extendable measuring tool of claim 1 further comprising:
    a distal base plate is located on the distal end of the inner extendable rule member.

9. The rigid extendable measuring tool of claim 8 wherein:
    said distal base plate extends past the external surface of the distal end of the inner extendable rule member.

10. The rigid extendable measuring tool of claim 1 further comprising:
    an external channel located on the external surface of the housing for engaging a marking tool.

11. The rigid extendable measuring tool of claim 10 wherein:
    said marking tool comprises at least one smooth slot and at least one notched slot.

12. A rigid extendable measuring tool comprising:
    a tubular housing an inner surface, an outer surface, a proximal end and a distal end;
    an inner extendable rule member having an outer surface, a proximal end and a distal end;
    said inner extendable rule member being insertable into said housing so that said inner extendable rule member is extendable from said housing;
    a plurality of graduated markings being located on said inner extendable rule member;
    at least one guide located on the inner surface of said housing that engages at least one channel located on the outer surface of said inner extendable rule member;
    said at least one channel located on the outer surface of said inner extendable rule being two channels making the inner extendable rule member substantially I-shaped;
    said at least one guide of the inner surface of the housing being two guides making the inner surface of the housing substantially H-shaped to engage the I-shaped inner extendable rule member.

13. The rigid extendable measuring tool of claim 12 further comprising:
    at least one window located on the housing that allows a user to view the plurality of graduated markings located on the inner extendable rule member within the housing.

14. The rigid extendable measuring tool of claim 12 further comprising:
   at least one leveling indicator located on the housing.

15. The rigid extendable measuring tool of claim 12 further comprising:
   a slide stop located on the proximal end of the inner extendable rule member.

16. The rigid extendable measuring tool of claim 12 further comprising:
   a proximal base plate is located on the proximal end of the housing.

17. The rigid extendable measuring tool of claim 16 wherein:
   said proximal base plate extends past the external surface of the housing.

18. The rigid extendable measuring tool of claim 12 further comprising:
   a distal base plate is located on the distal end of the inner extendable rule member.

19. The rigid extendable measuring tool of claim 18 wherein:
   said distal base plate extends past the external surface of the distal end of the inner extendable rule member.

20. The rigid extendable measuring tool of claim 1 further comprising:
   an external channel located on the external surface of the housing for engaging a marking tool having at least one smooth slot and at least one notched slot.

\* \* \* \* \*